Figure 12:
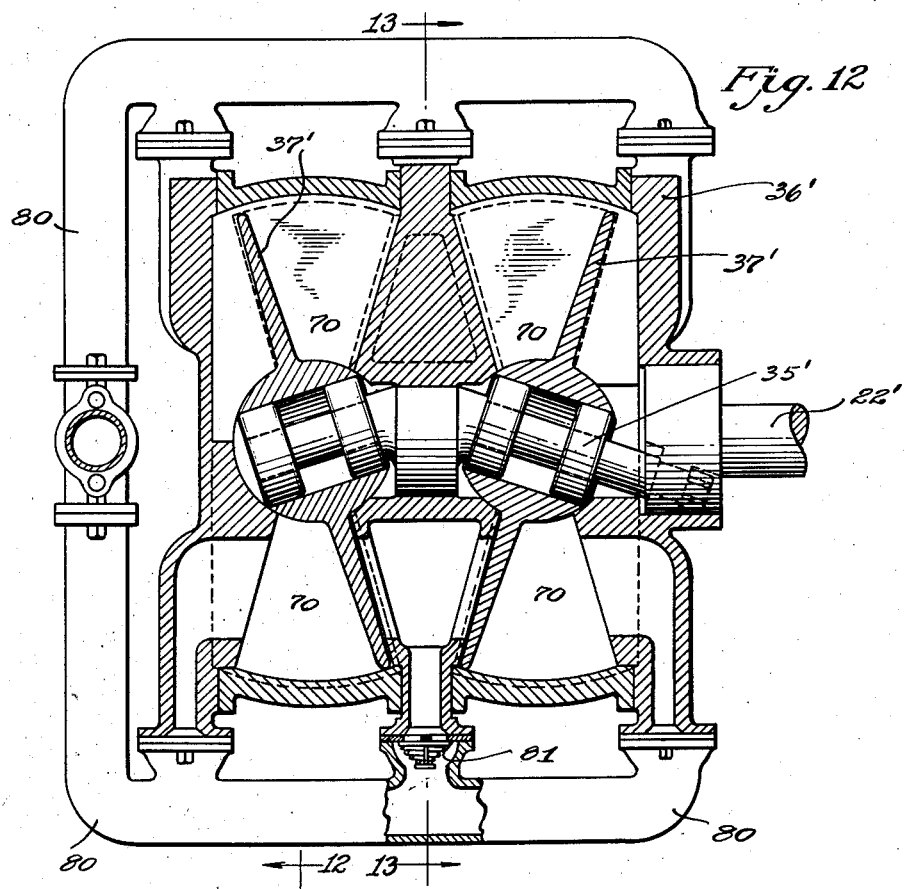

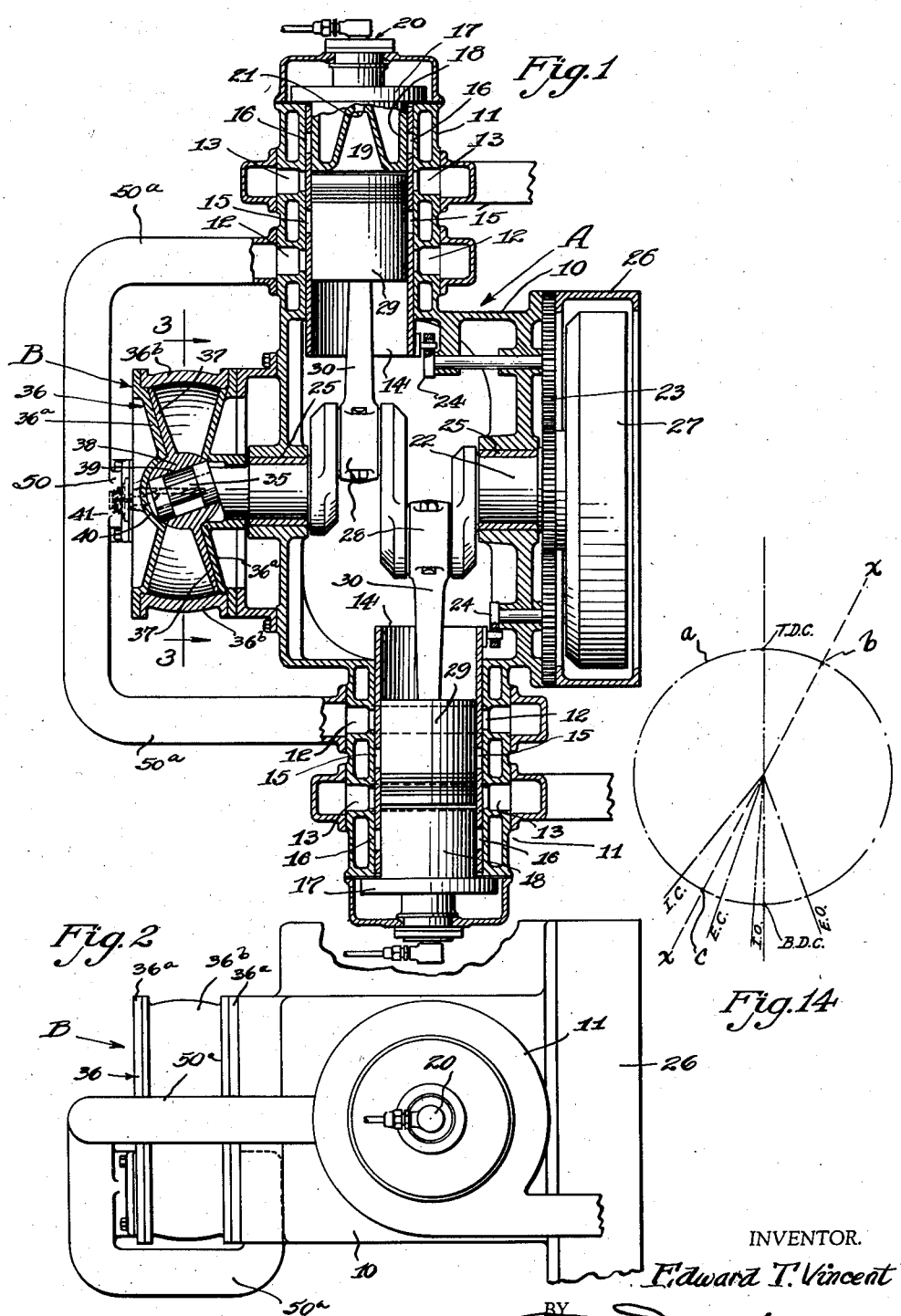

Oct. 1, 1935.  E. T. VINCENT  2,015,826
ENGINE
Filed Jan. 16, 1932  4 Sheets-Sheet 2
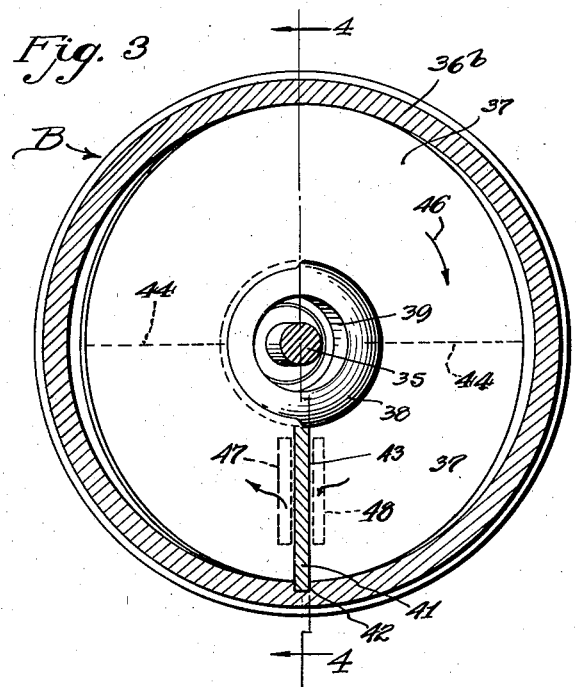
Fig. 3
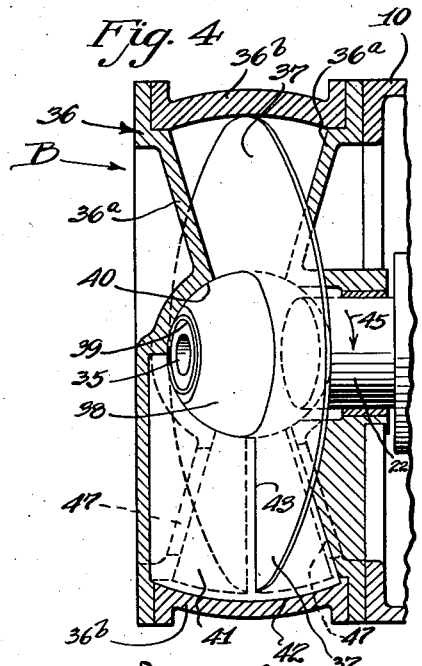
Fig. 4
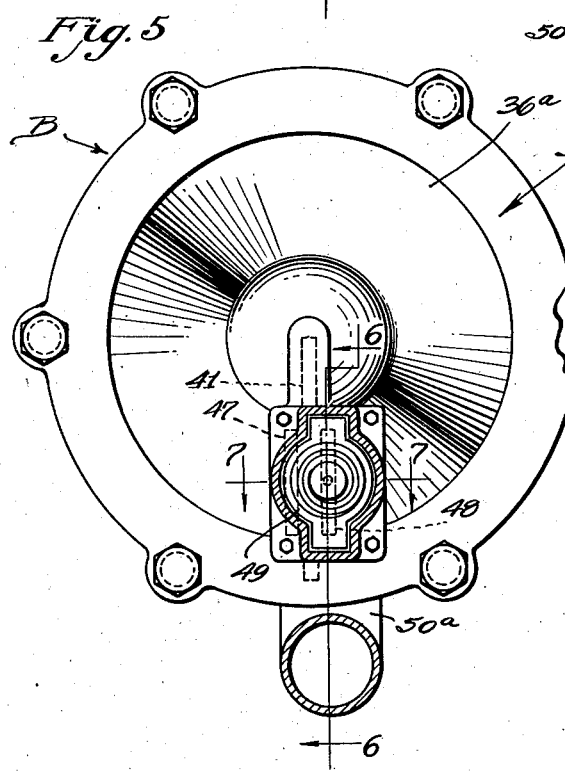
Fig. 5
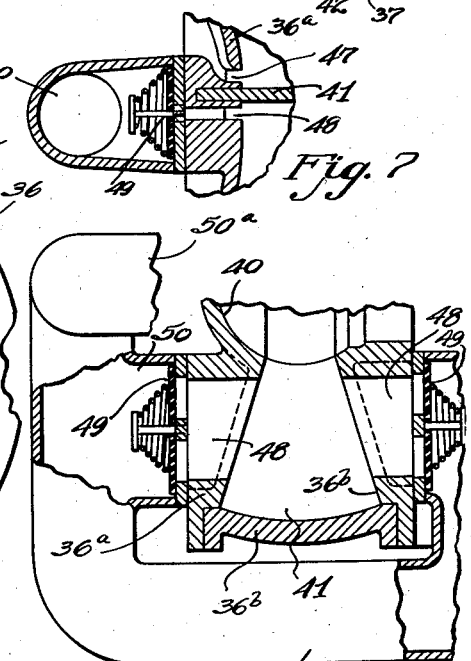
Fig. 6    Fig. 7
INVENTOR.
Edward T. Vincent
ATTORNEY.

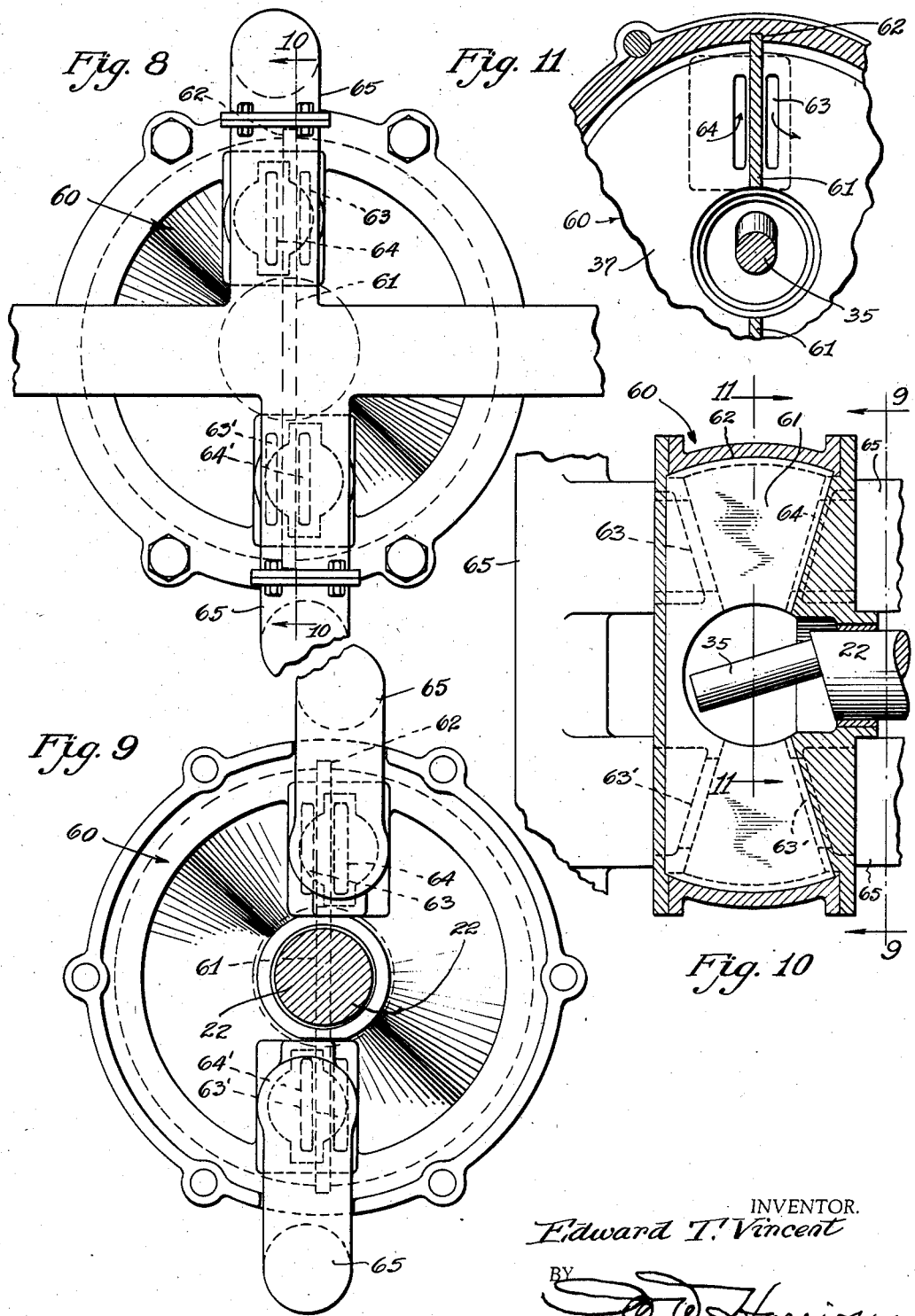

Oct. 1, 1935.  E. T. VINCENT  2,015,826

ENGINE

Filed Jan. 16, 1932  4 Sheets-Sheet 4

INVENTOR.
Edward T. Vincent
BY
ATTORNEY.

Patented Oct. 1, 1935

2,015,826

UNITED STATES PATENT OFFICE 2,015,826

ENGINE

Edward T. Vincent, Detroit, Mich., assignor to Continental Motors Corporation, Detroit, Mich., a corporation of Virginia Application January 16, 1932, Serial No. 587,001

6 Claims. (Cl. 123—56)

My invention relates to engines and more particularly to an improved pump mechanism cooperating therewith whereby to provide generally improved engine performance. One embodiment of my invention is illustrated in the accompanying drawings showing a multi-cylinder engine of the two-stroke compression ignition type having opposed cylinders, although it may be obviously understood that the principles of my invention may be incorporated in engines other than those of the compression ignition type and in engines other than those of the two stroke cycle type.

With engines of the type having offset opposed cylinders, operating on either the two or four stroke cycles, some difficulty has been experienced in efficiently balancing the engine to eliminate objectionable unbalanced couples, and in connection with engines of the compression ignition type difficulty has sometimes been encountered in supplying an adequate amount of air to the engine cylinders.

An object of my invention is to generally improve the operating characteristics of an engine of the aforesaid type.

Another object of my invention in its more particular aspects is to construct a pump structure adapted to relatively more efficiently supply a fluid to a multi-cylinder engine for facilitating combustion.

A further object of my invention in its more particular aspects is to generally improve engine performance by providing means operatively associated with the engine and in particular the engine crankshaft for counteracting unbalanced rocking couples set up in the operation of the engine.

For a more detailed understanding of my invention reference may be had to the accompanying drawings illustrating preferred embodiments of my invention, and in which:

Fig. 1 is a horizontal plan sectional view of an internal combustion engine and associated pump, Fig. 2 is an elevational view thereof, Fig. 3 is a vertical transverse sectional view taken substantially on the line 3—3 of Fig. 1 but showing the disc and ball in elevation, Fig. 4 is a longitudinal vertical sectional view taken on the line 4—4 of Fig. 3 but showing the pump disc and ball in elevation, Fig. 5 is an end elevational view of the pump and showing the pump outlet partly in section, Fig. 6 is a fragmentary detail sectional view taken on the line 6—6 of Fig. 5, Fig. 7 is a fragmentary detail view taken on the line 7—7 of Fig. 5, Fig. 8 is an end elevational view of a modified construction illustrating a plurality of fluid outlets, Fig. 9 is an elevational view of inner end of said pump structure taken on the line 9—9 of Fig. 10.

Figure 13:
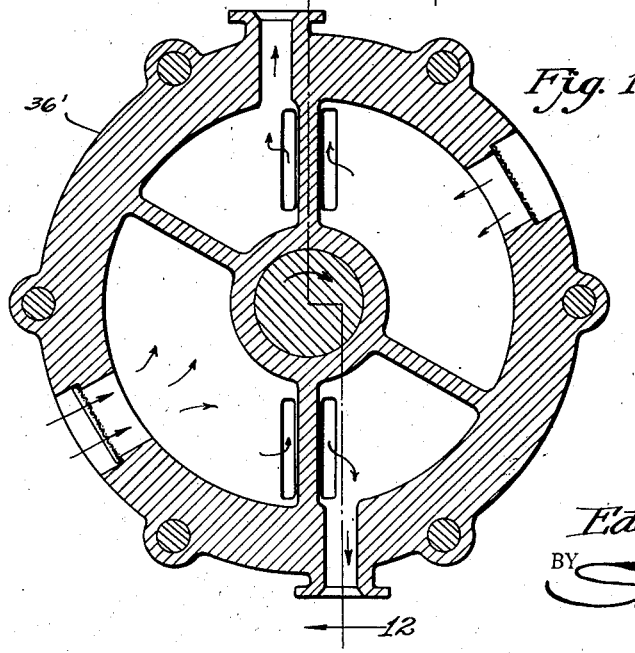

Fig. 10 is a sectional view taken substantially on the line 10—10 of Fig. 8,

Fig. 11 is a fragmentary sectional view taken substantially on the line 11—11 of Fig. 10, Fig. 12 is a plan sectional view taken substantially on the line 12—12 of Fig. 13 of a multiple pump structure illustrating a modified construction, and Fig. 13 is a detail sectional view taken on the line 13—13 of Fig. 12, and Fig. 14 is a timing diagram illustrating the timing of the pump delivery relative to the intake and exhaust cyclical periods.

With reference to Figs. 1 to 7 inclusive illustrating one embodiment of my invention, and with special reference to Figs. 1 and 2, I have provided an engine structure A comprising a crankcase 10 and opposed cylinders 11, said cylinders preferably having axes offset with respect to each other. The cylinders are each provided with intake and exhaust ports 12 and 13, the valving functions of the engine being controlled by any suitable valve means, which in the present embodiment of my invention comprise an associated sleeve valve 14 having intake and exhaust ports 15 and 16 respectively cooperating with the cylinder intake and exhaust ports 12 and 13. The outer open end of the cylinders are each preferably closed by a cylinder head structure 17 having a re-entrant head portion 18 depending within the cylinder and spaced from the walls thereof to provide a sleeve pocket for accommodating an upper or outer portion of the sleeve valve means. Said cylinder head structures are each provided with a combustion chamber 19 and preferably have associated therewith some suitable form of fuel injection and atomizing device 20 including an atomizing nozzle 21 adapted for spraying a combustible fuel into the combustion chamber 19.

Though I have illustrated my invention as being incorporated with a sleeve valve engine of the compression ignition type it will be understood that the particular type of valve means forms no part of my invention and the principles of my invention may be embodied in engines other than those of the compression ignition type and other than the two-stroke cycle engine herein illustrated. A sleeve valve engine lends itself quite readily to an engine incorporating my invention and I have chosen for purposes of illustration to provide a sleeve valve means comprising a single sleeve valve of the Burt McCollum type which is given a combined reciprocating and oscillating movement with respect to the cylinder and sleeve axes in performing the valving functions of the engine whereby any point on the sleeve traverses a closed curved path. Said valve means may be driven by any suitable mechanism and preferably said valve means is operatively driven from the engine crankshaft 22 through the agency of suitable gearing 23, said gearing driving cranks 24 each associated with one of said sleeve valve means for imparting the aforesaid reciprocating and oscillating movement thereto. Said crankshaft 22 is preferably supported in bearings 25 carried by the crankcase 10, one end of the crankshaft preferably extending into a gear case 26 and carrying a flywheel 27, the gearing for driving said sleeve actuating cranks being preferably housed within said gear case. The crankshaft is provided with crank portions 28 spaced axially of the shaft and adapted for operative connection with the pistons 29 by the associated connecting rods 30.

The engine, herein illustrated is preferably operated on the two stroke cycle, the air being introduced through the cooperating cylinder and intake ports 12 and 15 when the piston is at or near bottom dead center, the air being compressed during the outward stroke of the piston, the atomized fuel being sprayed into the engine in the usual manner and ignited when sprayed into contact with the compressed air.

In the engine illustrated I have provided an air pump B cooperatively associated with and operated by the crankshaft. In the construction illustrated, one end of the crankshaft preferably opposite to the end carrying the flywheel 27 is extended beyond the end face of the crankcase and is provided with a wobble extension or crank 35 whose axis is inclined with respect to the axis of the crankshaft. The wobble crank 35 extends within the pump casing 36 and supports a disc member or plate 37 having a ball portion 38 at the center, said wobble crank projected into an opening or bore 39 in said ball portion 38, said bore 39 preferably having an axis substantially perpendicular to the plane of the disc member or plate 37.

The casing preferably comprises a pair of cone shaped end members 36ª having apices extending towards each other, the base portion of said end members being secured to a segmental spherical spacer portion 36ᵇ, said end members being constructed with recesses 40 cooperating to provide a substantial spherical socket for supporting the ball portion 38 carried by the wobble plate or disc 37. A vane 41 is fixed or suitably secured to the casing and preferably is fixed therewith by projecting a portion of the vane into a slot or groove 42 carried by the spacer portion 36ª (see Figs. 3 and 4). The vane extends through a slot 43 in the wobble plate or disc 37 thereby fixing said wobble plate or disc against rotation with respect to said pump casing.

The inclination or slope of the conical surface of the end members 36ª with respect to a plane perpendicular to the crankshaft axis is preferably approximately the same as the inclination of the wobble crank 35 with respect to the crankshaft axis, so that the disc 37 engages the cone shaped end members with a line contact. On operating the engine, the line or contact between the disc and end members rolls about the casing because of the assembly of said disc with the wobble crank. In Fig. 3 the wobble disc 37 is so positioned as to have a line contact with the end members 36ª as indicated by the dotted line 44. On rotating the crankshaft 22 in the direction as indicated by the arrow 45 (see Fig. 4) the line of contact 44 between said disc and end members will move in the direction as indicated by the arrow 46 (see Fig. 3). On operation of the air pump air is drawn in through the opening or intake port 47 and discharged through the outlet port 48, a spring pressed valve 49 yieldingly closing said outlet port. The line of contact of said wobble plate or disc 37 with the surface of the casing passes over inlet port 47 immediately after the chamber, in advance of the line of contact, reaches maximum capacity, and the air therein is thus ejected through the outlet port due to decreasing the volume of the pump chamber, reverse flow of air being prevented by reason of the line of contact cutting off communication between the pump chamber and inlet port. A conduit 50 connects the pump outlet with the engine intake, said conduit 50 being preferably branched to provide branch conduits 50ª for conducting the air to both engine cylinders.

It will be noted that the construction herein described and illustrated in Figs. 1 to 7 inclusive provides a pair of inlets and a pair of outlets, one set of cooperating inlet and outlet ports being associated with one of the end members 36ª while the other set of cooperating inlet and outlet ports is associated with the other of said end members. The vane 41 extends only half way of the casing, preferably from the center downwardly.

It will be noted that my construction including a single vane will give two deliveries for each revolution of the crankshaft and there is no large revolving part having an appreciable sliding contact with another part. The only sliding or rubbing action resulting from the operation of my device is a very low velocity sliding action between the wobble disc or plate and the casing member 36ᵇ, and between the wobble disc and vane. Thus a minimum of frictional resistance in the operation of the pump is encountered.

The explosion and inertia forces set up by the action of one engine cylinder is balanced by those set up in the opposed cylinder because the cylinders are fired simultaneously. However, due to the fact that the cylinders are positioned off center, that is, the axis of one cylinder is offset with respect to the other, a slight rocking couple is set up in the engine, this rocking couple tending to set up an oscillating vibration in the plane containing the cylinder and crankshaft axes. By assembling the pump on the end of the crankshaft, and arranging the wobble and engine cranks in a definite angular phase relationship, the oscillations of the wobble plate oppose the oscillations due to the unbalanced couple, in other words the unbalanced couple is substantially balanced by the inertia forces of the pump disc.

The timing of the pump deliveries relative to the timing of the intake and exhaust opening and closing is such as to maintain a relatively high air pressure in the final stages of the scavenging operation. This is accomplished by timing the pump operation to deliver at its maximum rate a charge of air to the supply conduits 50 and 50ᵃ at or near the beginning of explosion or power stroke of the engine. In fact, said delivery may occur either prior to or after the beginning of the power stroke depending on the intake and exhaust timing. Thus on initially opening the cooperating cylinder and sleeve intake ports, the air under relatively high pressure rushes into cylinder and scavenges same. However, prior to closing said intake ports, the next maximum rate of pump delivery takes place, increasing the relative air pressure in the conduits and acting to supercharge the engine cylinder.

Referring more particularly to Fig. 14 representing a timing diagram, it may be noted that the diametric dotted line X—X intersects the circle diagram $a$ at $b$ and $c$ which represent the two points in the cycle at which the pump is delivering at its maximum rate. The exhaust opens when the piston is at or near bottom dead center (B. D. C.) represented by line designated E. O. When the intake opens represented by line designated I. O. the stored pressure effects a relatively quick scavenging of the engine cylinder. The exhaust is timed to close when the engine cylinder is substantially scavenged, exhaust closing being represented by the line designated E. C. The intake ports remain open after the exhaust closes in order to charge the cylinder with air in the case of a compression ignition engine or with a combustible mixture in the case of a spark ignition engine. However, in the meantime, the pump has commenced its second delivery and the delivery is so timed as to cause the maximum rate of delivery to occur at point $c$, thereby forcing a maximum amount of fluid into the engine cylinder in the shortest possible time due to the fact that a relatively high fluid pressure is maintained in supply conduits 50 and 50ᵃ in the final stages of the scavenging operation and while the intake ports are open.

I have found that this arrangement serves to improve the general engine performance. Because it is desirable to have two such pump deliveries for each cylinder per revolution of the crankshaft, and for other reasons it was found desirable to employ opposed offset engine cylinders and thus in an engine having two cylinders, a pump as illustrated in Figs. 1 to 7 inclusive gives very satisfactory service.

For an engine having four cylinders, I find that the most satisfactory arrangement is one where the four cylinders are fired in alternate pairs and since it is desirable to have at least two pump deliveries for each power stroke timed as described in the preceding paragraph I find it essential to provide a pump structure having at least four deliveries for each revolution of the crankshaft. This was accomplished by providing a structure as illustrated in Figs. 8 to 11 inclusive wherein a pump casing 60, constructed in general similar to that as previously described and shown in Figs. 1 to 7 inclusive, is provided with a vane 61 extending the full diameter of the casing and which is fixed to said casing by seating said vane in grooves 62. In this construction I have provided another set of inlet and outlet ports 63 and 64 in the casing substantially diametrically opposite to a set of inlet and outlet ports 63' and 64' similarly located and arranged as is the inlet and outlet ports 47 and 48. Thus this pump structure is provided with four (4) outlet ports whereas the structure illustrated in Figs. 1 to 7 inclusive is provided with only two (2) outlet ports. Suitable conduits 65 are arranged in communication with these outlet ports 64 and 64' for conveying the fluid (in this case air) to the engine intake ports.

Figs. 12 and 13 illustrate another alternative construction more particularly adapted for use with an engine having four or more cylinders. This pump structure is operated in accordance with the principles as described in connection with the pumps described in the preceding paragraphs. In this structure, however, the crankshaft 22' carries a double throw wobble extension 35', each throw of the extension supporting a wobble disc 37' each of which operates with a casing 36'. This arrangement provides a pump structure having a pair of pump units arranged in tandem. The vanes 70 associated with each pump unit extend the full diameter thereof. Each pump unit has four outlets and the whole structure provides for eight deliveries for each revolution of the crankshaft. The wobble plates or discs 37 are so arranged for operation so that the inertia forces counteract each other for use with an engine which is inherently balanced. The manifold receiver 80 communicates with all the outlets and preferably the outlets are closed by yieldably supported valves 81 similar in construction to the valves 49 associated with the outlets 48 of the two delivery pumps.

It will be apparent to those skilled in the art to which my invention pertains that various modifications and changes may be made therein without departing from the spirit of my invention or from the scope of the appended claims.

What I claim as my invention is:

1. In an engine provided with opposed cylinders and a crankshaft intermediate the cylinders, said cylinders being relatively offset axially of the crankshaft, reciprocating masses operable in said cylinders and producing a rocking couple in a longitudinal engine plane containing the crankshaft and cylinder axes, and an accessory mechanism operatively connected in driving relation with said crankshaft, said mechanism producing a rocking couple acting to oppose the unbalanced rocking couple produced in the engine by said reciprocating masses due to the offset of said cylinders.

2. In an engine provided with opposed cylinders and a crankshaft intermediate the cylinders, said cylinders being relatively offset axially of the crankshaft, reciprocating masses operable in said cylinders and producing a rocking couple in a longitudinal engine plane containing the crankshaft and cylinder axes, and a pump driven by said crankshaft, said pump producing a rocking couple acting to oppose the unbalanced rocking couple produced in the engine by said reciprocating masses due to the offset of said cylinders.

3. In an engine provided with opposed cylinders and a crankshaft intermediate the cylinders, said cylinders being relatively offset axially of the crankshaft, reciprocating masses operable in said cylinders and producing a rocking couple in a longitudinal engine plane containing the crankshaft and cylinder axes, and a pump including an oscillating wobble plate associated therewith and producing a rocking couple acting to oppose the unbalanced rocking couple produced in the engine by said reciprocating masses due to the offset of said cylinders.

4. In an engine provided with opposed cylinders and a crankshaft intermediate the cylinders, said cylinders being relatively offset axially of the crankshaft, reciprocating masses operable in said cylinders and producing a rocking couple in a longitudinal engine plane containing the crankshaft and cylinder axes, and a pump including a wobble plate, said crankshaft having a wobble crank for actuating said wobble plate whereby to produce a rocking couple acting to oppose the unbalanced rocking couple produced in the engine by said reciprocating masses due to the offset of said cylinders.

5. In an engine having a crankshaft and provided with opposed cylinders having offset axes lying in a common plane containing the crankshaft axis, reciprocating masses operable in said cylinders and producing a rocking couple in a longitudinal engine plane containing the crankshaft and cylinder axes, a wobble pump associated therewith and operated to produce a rocking couple acting to oppose the unbalanced rocking couple produced in the engine by said reciprocating masses due to the offset of said cylinders.

6. In an engine having a crankshaft and provided with opposed cylinders having axes lying substantially in a common plane containing the crankshaft axis, said crankshaft lying intermediate said cylinders, said cylinders being offset axially of the crankshaft, reciprocating masses operable in said cylinders and producing a rocking couple in a longitudinal engine plane containing the crankshaft and cylinder axes, and a wobble pump including an oscillating wobble plate driven by said crankshaft, the inertia forces of said wobble plate producing a rocking couple for opposing the unbalanced rocking couple produced in the engine by said reciprocating masses due to the offset of said cylinders.

EDWARD T. VINCENT.